United States Patent
Young et al.

(10) Patent No.: US 12,423,379 B2
(45) Date of Patent: Sep. 23, 2025

(54) IN SITU SPARSE MATRIX EXPANSION

(71) Applicant: Google LLC, Mountain View, CA (US)

(72) Inventors: Reginald Clifford Young, Palo Alto, CA (US); Trevor John Gale, San Francisco, CA (US)

(73) Assignee: Google LLC, Mountain View, CA (US)

(*) Notice: Subject to any disclaimer, the term of this patent is extended or adjusted under 35 U.S.C. 154(b) by 992 days.

(21) Appl. No.: 17/368,374

(22) Filed: Jul. 6, 2021

(65) Prior Publication Data
US 2023/0010897 A1    Jan. 12, 2023

(51) Int. Cl.
G06F 17/16    (2006.01)
(52) U.S. Cl.
CPC .................................. G06F 17/16 (2013.01)
(58) Field of Classification Search
CPC ...................................................... G06F 17/16
See application file for complete search history.

(56) References Cited

U.S. PATENT DOCUMENTS

| | | | |
|---|---|---|---|
| 10,621,269 B2 | 4/2020 | Phelps et al. | |
| 2014/0108481 A1* | 4/2014 | Davis ...................... | G06F 17/16 708/607 |
| 2019/0042250 A1 | 2/2019 | Anders et al. | |
| 2019/0042538 A1 | 2/2019 | Koren et al. | |
| 2019/0379396 A1* | 12/2019 | Bajic ...................... | G06F 17/16 |
| 2020/0226444 A1 | 7/2020 | Sharma et al. | |
| 2020/0278888 A1 | 9/2020 | Connor et al. | |
| 2021/0035258 A1 | 2/2021 | Ray et al. | |
| 2021/0097130 A1 | 4/2021 | Liu et al. | |

FOREIGN PATENT DOCUMENTS

| | | |
|---|---|---|
| JP | 2020-521192 A | 7/2020 |
| JP | 2020-140713 A | 9/2020 |
| JP | 2021-082289 A | 5/2021 |

OTHER PUBLICATIONS

E. Qin et al., "SIGMA: A Sparse and Irregular GEMM Accelerator with Flexible Interconnects for DNN Training," 2020 IEEE International Symposium on High Performance Computer Architecture (HPCA), San Diego, CA, USA, 2020, pp. 58-70, doi: 10.1109/HPCA47549.2020.00015. (Year: 2020).*

(Continued)

*Primary Examiner* — Carlo Waje
(74) *Attorney, Agent, or Firm* — Fish & Richardson P.C.

(57) ABSTRACT

Methods, systems, and apparatus, including computer programs encoded on computer storage media, for loading a matrix into a circuit having an array having M×N cells. One of the methods includes: receiving a plurality of non-zero input values from a first input matrix; receiving index metadata that indicates, for each non-zero input value in the plurality of input values, which cell of the M×N cells in the array the non-zero input value should be loaded into; sending the non-zero input values and the index metadata to the M×N cells; and at a particular cell of the M×N cells in the array: receiving a particular non-zero input value and corresponding index metadata; and determining from the corresponding index metadata for the particular non-zero input value whether to store the particular non-zero input value at the cell or to shift the particular non-zero input value to another cell.

21 Claims, 7 Drawing Sheets

(56) References Cited

OTHER PUBLICATIONS

Automatically Definition in Cambridge Dictionary, Aug. 19, 2019, https://web.archive.org/web/20190828113545/https://dictionary.cambridge.org/us/dictionary/english/automatically (Year: 2019).*
Dave et al., "Hardware Acceleration of Sparse and Irregular Tensor Computations of ML Models: A Survey and Insights", Jul. 2, 2020, https://arxiv.org/pdf/2007.00864v1 (Year: 2020).*
International Preliminary Report on Patentability in International Appln. No. PCT/US2022/036258, mailed on Jan. 18, 2024, 9 pages.
Extended European Search Report in European Appln. No. 22167898.0, dated Oct. 28, 2022, 11 pages.
Shail et al., "Hardware Acceleration of Sparse and Irregular Tensor Computations of ML Models: A Survey and Insights, " arXiv, Jul. 22, 2021, 44 pages.
Shi et al., "VersaGNN: A versatile accelerator for graph neural networks," arXiv, May 4, 2021, 13 pages.
Xin et al., "Sparse-TPU: adapting systolic arrays for sparse matrices," Proceedings of the 34th ACM International Conference on Supercomputing, Jun. 2020, 12 pages.
International Search Report and Written Opinion in International Appln. No. PCT/US2022/036258, dated Oct. 28, 2022, 16 pages.
Enoki et al., "Performance of System for Analyzing Diffusion of Social Media Messages in Real Time, " IEICE Technical Report, Jun. 2014, 114(101):6 pages.
Office Action in Japanese Appln. No. 2023-570438, mailed on May 7, 2025, 8 pages (with English translation).

\* cited by examiner

610

Clock Cycle 0
620

Clock Cycle 1
630

IN SITU SPARSE MATRIX EXPANSION

BACKGROUND

This specification generally relates to using circuitry to process a matrix.

SUMMARY

According to one innovative aspect of the subject matter described in this specification, a computing system can improve throughput for loading an input matrix into a matrix multiply unit by increasing the rate in which values from the input matrix is loaded into an array of cells in the matrix multiply unit. For example, the matrix processor can be a part of special-purpose hardware circuits that train neural networks, compute neural network inferences, or both.

One way to improve the throughput is to increase the rate of loading matrices, and particularly sparse matrices into the array of cells. A sparse matrix is a matrix that has many elements that have a "null" value, i.e. values which are zero. For example, a matrix can be considered sparse if more than half of the values of the matrix are null.

In general, one innovative aspect of the subject matter described in this specification can be embodied in methods that include the actions performed by a hardware device comprising circuitry for an array having M×N cells of, the actions comprising: receiving, at the hardware circuitry, a plurality of non-zero input values from a first input matrix to be multiplied with a second input matrix using the array, the first input matrix comprising the plurality of non-zero input values and a plurality of zero input values; receiving, at the hardware circuitry, index metadata that indicates, for each non-zero input value in the plurality of input values, which cell of the M×N cells in the array the non-zero input value should be loaded into; sending, using the hardware circuitry, the non-zero input values and the index metadata to the M×N cells; and at a particular cell of the M×N cells in the array: receiving a particular non-zero input value and corresponding index metadata for the particular non-zero input value; and determining from the corresponding index metadata for the particular non-zero input value whether to store the particular non-zero input value at the cell for use in performing multiplication or to shift the particular non-zero input value to another cell, wherein M and N are positive integers larger than one.

Implementations can include one or more of the following features. The method may further comprise: at the particular cell of the M×N cells in the array and prior to sending the non-zero input values and the index metadata to the M×N cells: automatically loading a zero input value into the cell. Sending the non-zero weight input values and the index metadata to the M×N cells may comprise sending the non-zero weight input values along a first dimension of the array that has the M×N cells. The first dimension of the array may comprise a vertical dimension of the array; and sending the non-zero weight inputs and the index metadata to the M×N cells along the first dimension of the array may comprise sending the non-zero weight inputs and the index metadata beginning from a top fringe of the array. The first dimension of the array may comprise a horizontal dimension of the array; and sending the non-zero weight inputs and the index metadata to the M×N cells along the first dimension of the array may comprise sending the non-zero weight inputs and the index metadata beginning from a left fringe of the array. The index metadata may comprise an absolute fixed-length row index for each non-zero input value. The index metadata may comprise a run-length encoded row index for each non-zero input value. The index metadata may comprise a bitmap of locations of the non-zero input values in the M×N cells of the array. The hardware device may further comprise a comparator for each cell in the M×N cells of the array, the comparator configured to compare (i) the index metadata for each non-zero input value with (ii) an index of the cell that indicates its location in the M×N cells along the first dimension of the array. The plurality of input values may be in a compressed sparse column (CSC) matrix format. The hardware device may further comprise a first-in, first-out (FIFO) register for each cell in the M×N cells of the array, and wherein loading the respective non-zero input value into the cell may comprise enqueuing the respective non-zero input value in the FIFO register associated with the cell. The method may further comprise, for each cell in the array storing a particular non-zero input value: receiving, using the hardware circuitry, a second input value from the second input matrix; and determining, using the hardware circuitry, a respective multiplication product based on the particular non-zero input value and the second input value. The non-zero input values may move by one cell per clock cycle. The method may further comprise: determining that the first input matrix includes a column that only has zero input values; and in response, adding a sign bit to the index defined by the corresponding index metadata for each zero input value.

Other implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

Particular embodiments of the subject matter described in this specification can be implemented so as to realize one or more of the following advantages. This specification describes a matrix multiply unit that can load an input matrix to be multiplied with another matrix (or vector) in many fewer clock cycles than conventional matrix multiply units. In particular, a matrix multiply unit with a comparator per cell of an array can load only non-zero input values (i.e., elements having non-zero values from an input matrix), instead of all obtained input values including zero input values, into respective cells of the array. A special purpose hardware circuit can then effectively load input values into the array of the matrix multiply unit by expanding a matrix inside the matrix multiply unit, e.g., rather than outside the matrix multiply unit and in a separate processing unit, or at the border of the matrix multiply unit, thereby enabling the hardware circuit to more efficiently perform matrix operations. This can save time needed for loading input values into the matrix multiply unit, e.g., in terms of total number of clock cycles needed to load input values into respective cells of the array through input value-loading wires coupling an external memory unit to each cell. This can also permit better utilization of memory capacity, bandwidth, or both of the hardware circuit, which further improves performance.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

In general, data can be represented in the form of a matrix and a computing system may manipulate the data by executing matrix operations. A matrix may be a one-dimensional vector or a multi-dimensional matrix. A matrix may be represented by a data structure, such as a database table or a variable. A sparse matrix is a matrix that has many elements that have a "null" value, i.e. values which are zero. For example, a matrix can be considered sparse if more than half of the values of the matrix are null.

Figure 1:
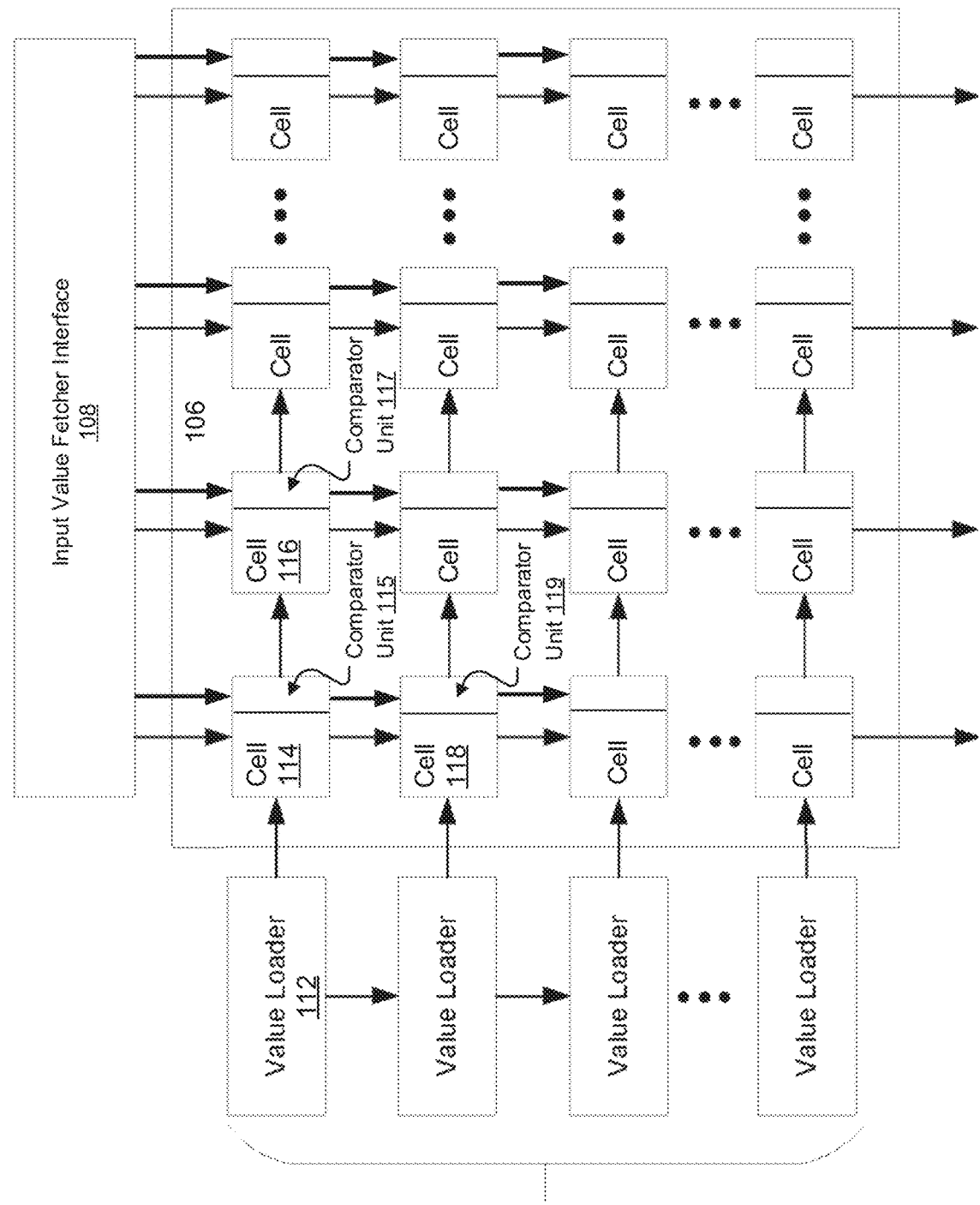
FIG. 1 shows an example architecture including a matrix computation unit.

FIG. 1 shows an example architecture 100 including a matrix computation unit. The matrix computation unit is a two-dimensional array 106. The array 106 includes multiple cells, e.g., cells 114, 116, and 118. In some implementations, a first dimension of the array 106 is a vertical dimension which corresponds to rows of cells and a second dimension of the array 106 is a horizontal dimension which corresponds to columns of cells. The array 106 can have more rows than columns, more columns than rows, or an equal number of columns and rows.

In some implementations, the matrix computation unit may include additional circuitry, e.g., within each cell of the two-dimensional array 106 of cells, that is configured to process data.

As one example, the matrix computation unit can be part of a special-purpose hardware circuit that trains neural networks, computes neural network inferences, or both, and the matrix computation unit can be a matrix multiply unit which performs matrix multiplication operations between two matrices. That is, the matrix computation unit can be used to perform mathematical operations, e.g., multiplication and addition, in a neural network by using multiplication and summation circuitry within cells of the array 106 and by working together with additional components of a hardware circuit which, for example, may include a scalar processing unit and a vector processing unit, as well as associated scalar memory and vector memory.

As another example, the matrix computation unit can be a cross-lane unit configured to move data between different lanes of the plurality of lanes. As used herein, a lane generally corresponds to an area, section or portion of an example hardware circuit that can include a computing/data processing resource(s) of the hardware circuit. For example, the cross-lane unit can be a transpose unit, a reduction unit, or a permutation unit. The transpose unit can perform a transposition operation of a matrix. That is, the transpose unit can take in numbers in one dimension (e.g., along a given row) and transposes them so that the number across a lane is transposed with the number in the other dimension (e.g., along a given column). The reduction or permutation unit can address the problem of cross-lane communication by supporting various operations such as permutation, lane rotation, rotating permutation, lane reduction, permuted lane reduction, and segmented permuted lane reduction.

As another example, the matrix computation unit can be an arithmetic unit that performs operations such as square root, logarithmic, and reciprocal through table-driven function approximations. For example, the arithmetic unit can perform a multi-entry, multi-port table lookup, e.g., 128-entry, 128-port table lookup, per clock cycle. Additionally, in this example, the arithmetic unit can bridge to larger tables by using zero-hot encoding, and can bridge to more ports by replaying the input values loaded into the arithmetic unit. Zero-hot encoding is an extension to one-hot encoding with an initial state vector of zero, for example: [0 0 0; 0 0 1; 0 1 0; 1 0 0].

As yet another example, the matrix computation unit can be a tensor unit that can compress or inject padding data to tensors, thereby offering additional storage savings while still supporting efficient matrix computations. A tensor generally refers to a multidimensional array of numeric or other values, e.g., strings, having a specific order that corresponds to the dimensionality of the array. For example, a scalar value is a 0th-order tensor, a vector of numeric values is a 1st-order tensor, and a matrix is a 2nd-order tensor.

More details about the functionalities of these example hardware components such as the scalar or vector processing units and extended vector units can be found in U.S. Pat. No. 10,621,269 B2, entitled PERFORMING MATRIX MULTIPLICATION IN HARDWARE, which was filed on May 17, 2018 and granted on Apr. 14, 2020, which is herein incorporated by reference.

Generally, before beginning a series of matrix operations such as matrix-matrix multiplies or vector-matrix multiplies, at least a portion of a matrix needs to be pre-loaded into the matrix computation unit. In the above examples, the matrix computation unit can improve throughput across the hardware circuit by increasing the rate in which input values are loaded into the matrix computation unit, thereby enabling the hardware circuit to more efficiently perform matrix computations, e.g., computations for processing a neural network.

Loading a matrix into the matrix computation unit generally involves shifting, e.g., in accordance with host interface control signals, input values from the matrix throughout the array 106 along one dimension, e.g., from the left to the right, or from the top to the bottom. For example, over one clock cycle, the input value at cell 114 can shift to a register at cell 116, which is to the right of cell 114. Similarly, the input value at cell 114 can shift to a register at cell 118, which is below cell 114.

As illustrated, each cell of the two-dimensional array 106 of cells is associated with a comparator unit, e.g., comparator unit 115, 117, or 119. Each cell can be connected to an associated comparator unit, e.g., using a wire. The comparator unit includes hardware circuitry for comparing two input numbers, e.g., digital or binary numbers, to determine whether one input number is equal, less than or greater than the other input number. For example, a comparator unit, e.g., comparator unit 115, can be a multi-bit binary comparator configured to determine equality between two multi-bit binary numbers, e.g., four-bit, seven-bit, or eight-bit binary numbers. As will be described further below, the matrix computation unit makes use of the comparator units to improve efficiency in loading data into the array 106 of cells, e.g., before the matrix operation begins.

In some implementations, the register at each cell of the two-dimensional array 106 of cells can be a first-in, first-out (FIFO) register, and loading the respective non-zero input value into the cell includes enqueuing the respective non-zero input value in the FIFO register associated with the cell. Similarly, unloading the respective non-zero input value from the cell includes dequeuing the respective non-zero input value from the FIFO register associated with the cell.

In some implementations, each cell of the two-dimensional array 106 of cells can include multiple registers that are each operable to store a different input value, e.g., a weight input or an activation input value. The registers at the same cell can be of a same type, e.g., a FIFO register, or of different types.

The matrix can be delivered to the matrix computation unit over source buses by the buses connected to the matrix computation unit and then loaded into a register so that the matrix operation can begin. For example, the matrix can be delivered from a memory unit or a memory buffer of the system, which may be located off the circuit.

In some implementations, the matrix is received in a compressed format such as a compressed sparse row (CSR) format or a compressed sparse column (CSC) format that generally uses linear (i.e., one-dimensional) arrays to store information about the matrix. When represented in such compressed format, the data describing the matrix generally includes associated index metadata which indicates, for each non-zero element (or entry) within the matrix (referred to below as "non-zero input value"), a corresponding position of the non-zero input value in the original matrix. This index metadata further indicates which cell of the two-dimensional array of cells that the non-zero input value should be loaded into.

Let A be an m×n matrix with e non-zero input values. Let Av, Ac, and Ar be three one-dimensional arrays of length e, e, and (m+1), respectively. In CSR format, A is encoded as <Av, Ac, Ar>, in which:

value array Av holds the values of all the non-zero input values in A in row-major order,
column array Ac holds the columns of all the non-zero input values in A in row-major order,
row-index array Ar holds the index in Av of the first non-zero input value of each row in A, with the last element in the Ar array being the total number of elements in the Av array.

For example, the following 4×4 matrix $$A = \begin{bmatrix} 0 & 0 & 0 & 1 \\ 0.5 & 0 & 0 & 0.5 \\ 0.5 & 0.5 & 0 & 0 \\ 0 & 0 & 1 & 0 \end{bmatrix}$$

can be encoded in CSR as <Av=[1, 0.5, 0.5, 0.5, 0.5, 1], Ac=[3, 0, 3, 0, 1, 2], Ar=[0, 1, 3, 5, 6]>.

In this and the other example described below, the rows and the columns are indexed, with indices starting at zero, increasing for columns going from left to right, and for rows going from top to bottom of the matrix. Thus, the matrix A above has indices of rows and columns going from 0 to 3.

A matrix can also be encoded in the compressed sparse column (CSC) format, which is often seen as CSR "transposed". Let A be an m×n sparse matrix with e non-zero input values. Let A'v, A'c and A'r be three one-dimensional arrays of length e, e, and (n+1), respectively. In CSC format, A is encoded as <A'v, A'r, A'c>, in which:

value array A'v holds the values of all the non-zero input values in A in column-major order,
row array A'r holds the rows of all the non-zero input values in A in column-major order,
column-index array A'c holds the index in A'v of the first non-zero input value of each column in A, with the last element in the A'c array being the total number of elements in the A'v array.

The same 4×4 matrix $$A = \begin{bmatrix} 0 & 0 & 0 & 1 \\ 0.5 & 0 & 0 & 0.5 \\ 0.5 & 0.5 & 0 & 0 \\ 0 & 0 & 1 & 0 \end{bmatrix}$$

shown earlier can be encoded in CSC as: <A'v=[0.5, 0.5, 0.5, 1, 1, 0.5], A'r=[1, 2, 2, 3, 0, 1], A'c=[0, 2, 3, 4, 6]>.

Hence, the row and column index information contained in the CSR or CSC representation of a matrix corresponds to the associated metadata of the matrix that indicates, for each non-zero input value in the plurality of input values, which cell in the two-dimensional array of cells the non-zero input value should be loaded into.

The index metadata associated with the matrix may be pre-generated and received by the system together with the matrix, or generated by a different component, e.g., a metadata generation unit, of the system from the received matrix on-the-fly. Similarly, the index metadata can be delivered to the matrix computation unit over additional buses (or wires) and from the memory unit or the memory buffer and can be shifted together with the input values from the matrix throughout the array 106 along one dimension, e.g., from the left to the right, or from the top to the bottom. For example, over one clock cycle, index metadata describing the input value at cell 114 can shift to the comparator unit 117 associated with cell 116, which is to the right of cell 114. Similarly, the index metadata describing input value at cell 114 can shift to the comparator unit 119 associated with cell 118, which is below cell 114. Example index metadata and loading a matrix into a matrix computation unit by using the index metadata will be described further below.

In the illustrated example of FIG. 1, the matrix computation unit is a matrix multiply unit, where an input value fetcher interface 108 sends input values of a first input matrix as well as associated index metadata of the first input matrix to columns of the array 106 and the value loaders 112 send input values of a second input matrix as well as associated index metadata of the second input matrix to rows of the array 106. In some other implementations, however, input values of a first input matrix are transferred to the rows and input values of a second input matrix are transferred to the columns of the array 106.

For example, the input values of the first input matrix can correspond to the weight input values and the input values of the second input matrix can correspond to the input activation values, where the weight input value and the input activation value are associated with a layer of multiple layers a neural network that can be used to compute inferences.

For example, given an input, the neural network can compute an inference for the input. The neural network computes this inference by processing the input through each of the layers of the neural network. In particular, the layers of the neural network are arranged in a sequence, each with a respective set of weights. Each layer receives an input and processes the input in accordance with the set of weights for the layer to generate an output. Therefore, in order to compute an inference from a received input, the neural network receives the input and processes it through each of the neural network layers in the sequence to generate the inference, with the output from one neural network layer being provided as input to the next neural network layer. Data inputs to a neural network layer, e.g., either the input to the neural network or the outputs of the layer below the layer in the sequence, to a neural network layer can be referred to as activation inputs to the layer.

The input value fetcher interface 108 of FIG. 1 can receive the input values and the associated index metadata from a memory unit, e.g., a dynamic memory. The input value fetcher interface 108 can send a corresponding input value to a distinct top-most cell of the array 106, e.g., by using a data wire. The input value fetcher interface 108 can also send the associated index metadata to a distinct top-most cell of the array 106, e.g., by either using an additional wire or reusing the same data wire. The top-most cell can be a cell along a top-most row of the array 106. For example, the input value fetcher interface 208 can send input values to cells 114 and 116.

The value loaders 112 of FIG. 1 can receive the input values and the associated index metadata from a memory buffer, e.g., a unified buffer. Each value loader 112 can send a corresponding input value to a distinct left-most cell of the array 106. The left-most cell can be a cell along a left-most column of the array 106. For example, a value loader 112 corresponding to cell 114 can send an input value to the cell 114.

However, when the size of a matrix is too large, the amount of time it takes to inject the entire matrix (i.e., all input values of the matrix) into the matrix computation unit may be long. Thus, to efficiently inject the matrix into the matrix computation unit, i.e., to reduce the number of cycles that the injection ports atop the matrix computation unit are operating to inject the matrix, the matrix computation unit makes use of the comparator units to determine, e.g., at a particular cell of the two-dimensional array 106 of cells of the matrix computation unit, whether the index metadata associated with an input value shifted to the particular cell matches a location index of the particular cell in the two-dimensional array. In response to a positive determination, the matrix computation unit then stores an input value at a register of the particular cell for later use in performing a matrix operation. Alternatively, in response to a negative determination, the system shifts, rather than stores, the input value to an adjacent cell of the particular cell.

In this way, the number of clock cycles required to inject the entire matrix decreases from being approximately equal to the dimensions of a (square) matrix to being approximately equal to the number of non-zero values in the column (or row) of the matrix that has the most non-zero values. When the matrix is a sparse matrix, the number of clock cycles that is required can decrease by an order of magnitude, or more. This can also make it easier to inject a dense matrix, i.e., a matrix with more non-zero input values than zero input values. To use the same mechanism for injecting a dense matrix, a counter can be arranged at the top fringe to add an index to each input value that passes through the top fringe.

Figure 2:
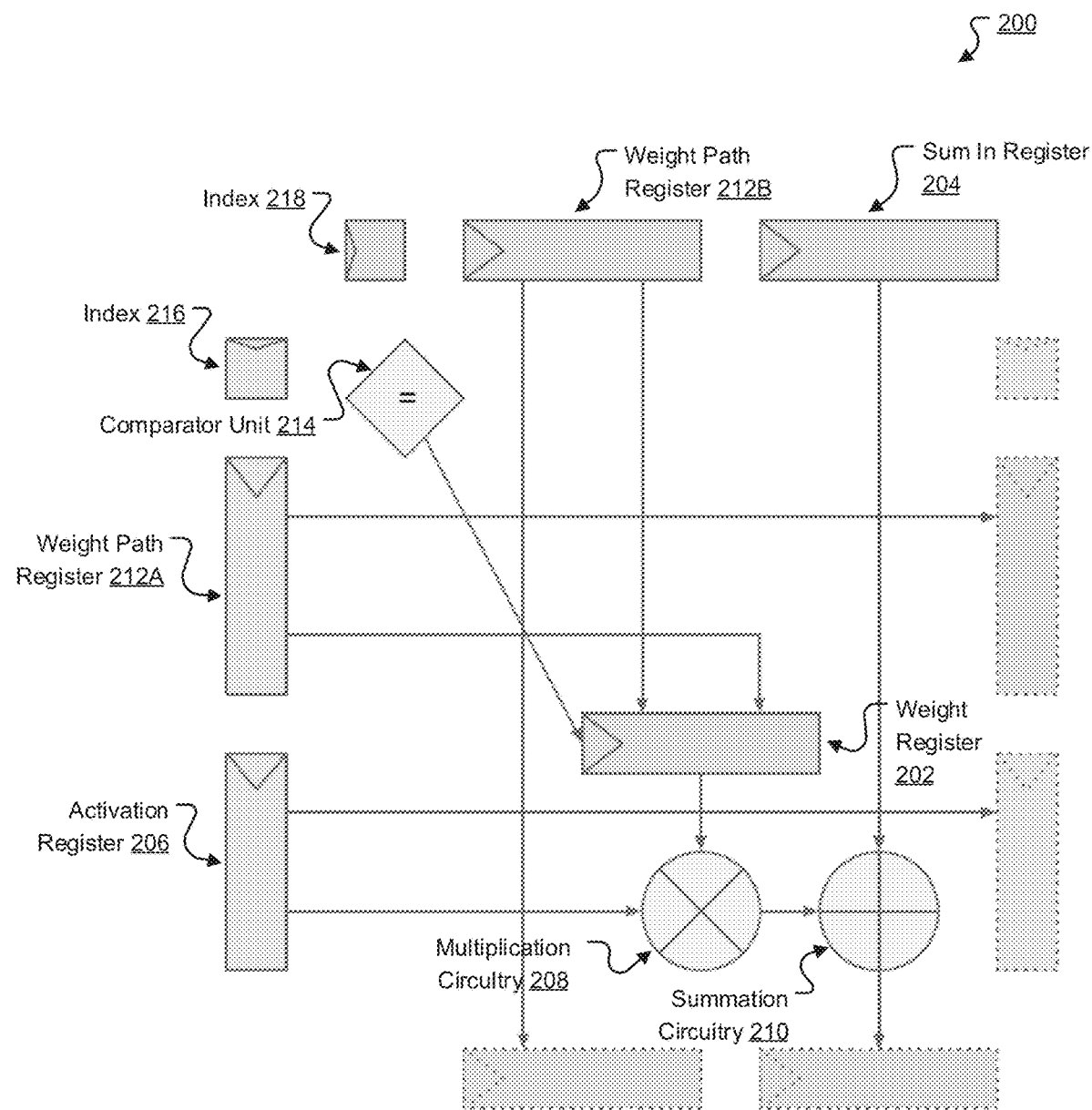
FIG. 2 shows an example architecture of a cell inside a two-dimensional array of a matrix computation unit.

FIG. 2 shows an example architecture 200 of a cell inside a two-dimensional array of a matrix computation unit. In the example of FIG. 2, the matrix computation unit is depicted as a matrix multiply unit having a two-dimensional array that is wired to perform matrix multiply operations, e.g., multiply a 128-element vector by a 128×128 matrix.

The cell can include an activation register 206 that stores an activation input. The activation register can receive the activation input from a left adjacent cell, i.e., an adjacent cell located to the left of the given cell, or from a memory buffer, depending on the position of the cell within the array. The cell can include two weight path registers 212A-B, each of which can receive a weight input and transfer the weight input to a weight register 202. The weight register 202 can then store the weight input based on a control signal. For example, the weight input can be shifted to the weight path register from a top adjacent cell or from a weight fetcher interface, depending on the position of the cell within the array. The cell can also include a sum in register 204. The sum in register 204 can store an accumulated value from the top adjacent cell. The weight register 202, the sum in register 204, the activation register 206, and the weight path registers 212A-B can be registers that are configured to store values of a particular size, such as floating point values of a particular format.

Multiplication circuitry 208 can be used to multiply the weight input from the weight register 202 with the activation input from the activation register 206. The multiplication circuitry 208 can output the product to summation circuitry 210. In some implementations, the input and output values of the multiplication circuitry 208 may be of different sizes and/or formats.

The summation circuitry 210 can sum the product and the accumulated value from the sum in register 204 to generate a new accumulated value. The summation circuitry 210 can then send the new accumulated value to another sum in register located in a bottom adjacent cell. The new accumulated value can be used as an operand for a summation in the bottom adjacent cell. The summation circuitry 210 can also accept a value from the sum in register 204 and send the value from the sum in register 204 to a bottom adjacent cell without summing the value from the sum in register 204 with the product from the multiplication circuitry 208. In some implementations, the input values of the summation circuitry 210 may be of different sizes and/or formats. In some implementations, some input and output values of the summation circuitry 210 may be of different sizes and/or formats.

The cell can also shift the weight input and the activation input to adjacent cells for processing. For example, the weight path register 212B can send the weight input to another weight register in the bottom adjacent cell. The activation register 206 can send the activation input to another activation register in the right adjacent cell. Both the weight input and the activation input can therefore be reused by other cells in the array at a subsequent clock cycle.

Notably, the cell also includes a comparator unit 214. The comparator unit can determine equality between two input values. For example, the comparator unit 214 can compare the index 216 defined by the index metadata associated with a weight input transferred from weight path register 212A against a location index of the cell in the two-dimensional array. As another example, the comparator unit 214 can compare an index 218 defined by the index metadata associated with a weight input transferred from weight path register 212B against the location index of the cell in the two-dimensional array. The comparator unit can send a control signal to the weight register 202 based on the result of the comparison, e.g., by using a wire. In particular, the control signal generated by the comparator unit 214 can regulate handling of the weight input by the cell, i.e., regulates whether the cell should store the weight input at the weight register 202 so as to be operated on by the multiplication circuitry 208 (in the case of equality) or shift the weight input to an adjacent cell (in the case of inequality) at each clock cycle.

The index metadata can generally be created and maintained in any of a variety of ways. A few examples of the index metadata are described next.

Figure 3:
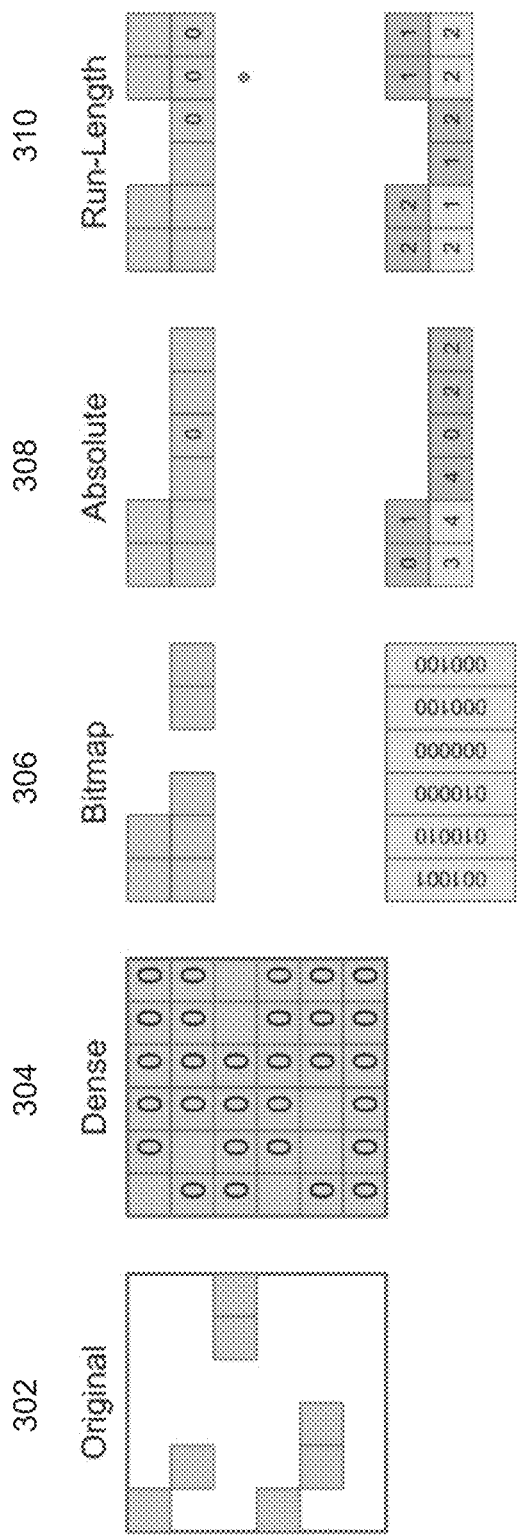
FIG. 3 shows example illustrations of different index metadata.

FIG. 3 shows example illustrations of different index metadata.

The original matrix in the example of FIG. 3 has a plurality of non-zero input values and a plurality of zero input values. Each of the plurality of non-zero input values and the plurality of zero input values resides at a distinct location in the original matrix, as illustrated in 302 and 304, respectively.

In one example, as illustrated in 306, the index metadata can include bitmap index. For example, the index metadata can include a bitmap of respective locations of the non-zero input values with reference to the original matrix.

In another example, as illustrated in 308, the index metadata can include absolute fixed-length row index. For example, the absolute fixed-length index can be an absolute fixed-length column or row index, i.e., with reference to the original matrix, for each non-zero input value of the matrix.

In another example, as illustrated in 310, the index metadata can include run-length encoded index. For example, the run-length encoded index can be a run-length encoded column or row index, i.e., with reference to the original matrix, for each non-zero input value of the matrix. Run-length encoding is a technique that allows for store index metadata using a variable-length data field and thereby offering increased storage savings.

In these examples, the index metadata generally indicates or otherwise specifies which cell of the two-dimensional array of cells that each non-zero input value should be loaded into. In addition, the index metadata can further indicate whether an input value included in the matrix is a non-zero value. For example, the index metadata can include an additional sign bit prepended to the original, unsigned index of each zero input value, so that the zero input value will not be loaded into the array because a negative index never matches the location index of any cell within the array.

By loading a matrix into a two-dimensional array of the matrix computation unit while making use of the comparator units to determine whether there's a match between the index metadata associated with each non-zero input value of the matrix and the location index of a particular cell in the two-dimensional array, the matrix computation unit can reduce the amount of time it takes to load because loading the entire matrix including any zero input values into the matrix computation unit is no longer required. Instead, only a relatively smaller set of non-zero input values in the matrix need to be loaded. This matrix loading process is described in greater detail below.

Figure 4:
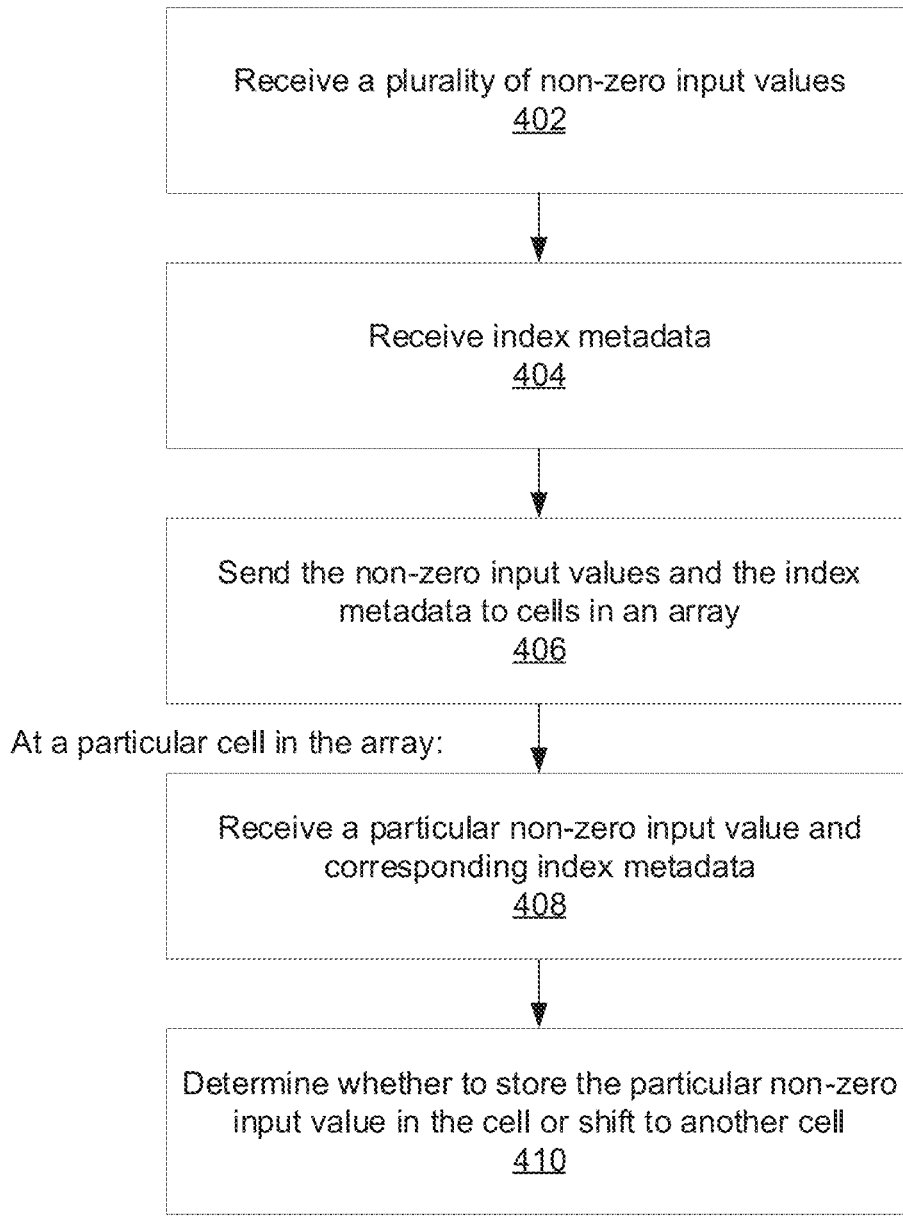
FIG. 4 is a flow diagram that illustrates an example of a process for loading a matrix into a matrix computation unit.

FIG. 4 is a flow diagram 400 that illustrates an example of a process for loading a matrix into a matrix computation unit. For convenience, the method 400 will be described with respect to a system having one or more circuits. For example, referring to FIG. 1, the system can include a matrix computation unit configured as a two dimensional array comprising a plurality of cells that are physically or logically arranged into M rows and N columns, where M and N are positive integers greater than one.

The system receives, at the hardware circuitry, a plurality of non-zero input values from a first input matrix to be multiplied with a second input matrix using the array (402).

The first input matrix can be a matrix which includes the plurality of non-zero input values and a plurality of zero input values. The second input matrix, which may similarly include a plurality of non-zero input values and a plurality of zero input values, can have a same or different dimension than the first matrix.

The system receives, at the hardware circuitry, index metadata that indicates, for each non-zero input value in the plurality of input values, which cell of the MXN cells in the array the non-zero input value should be loaded into (404). The index metadata can be represented in the forms of absolute fixed-length row index, run-length encoded row index, or bitmap index, to name just a few examples. In other words, the system can receive absolute fixed-length row indices, run-length encoded row indices, or bitmap indices that each specify location information of the non-zero input values with reference to the original matrix. In some implementations, the system can receive the index metadata together with the first input matrix, e.g., from the memory unit or the memory buffer of the system. For example, the first input matrix may be received in a compressed sparse row (CSR) format or a compressed sparse column (CSC) format, where the row and column index information of the non-zero input values in the first input matrix corresponds to the associated index metadata.

In other implementations, the system can generate the index metadata from the received first input matrix on-the-fly. That is, the system preprocesses the first input matrix, e.g., by using a metadata generation unit of the system, before loading it into the matrix computation unit and using it to perform mathematical operations such as multiplication and addition.

Figure 5:
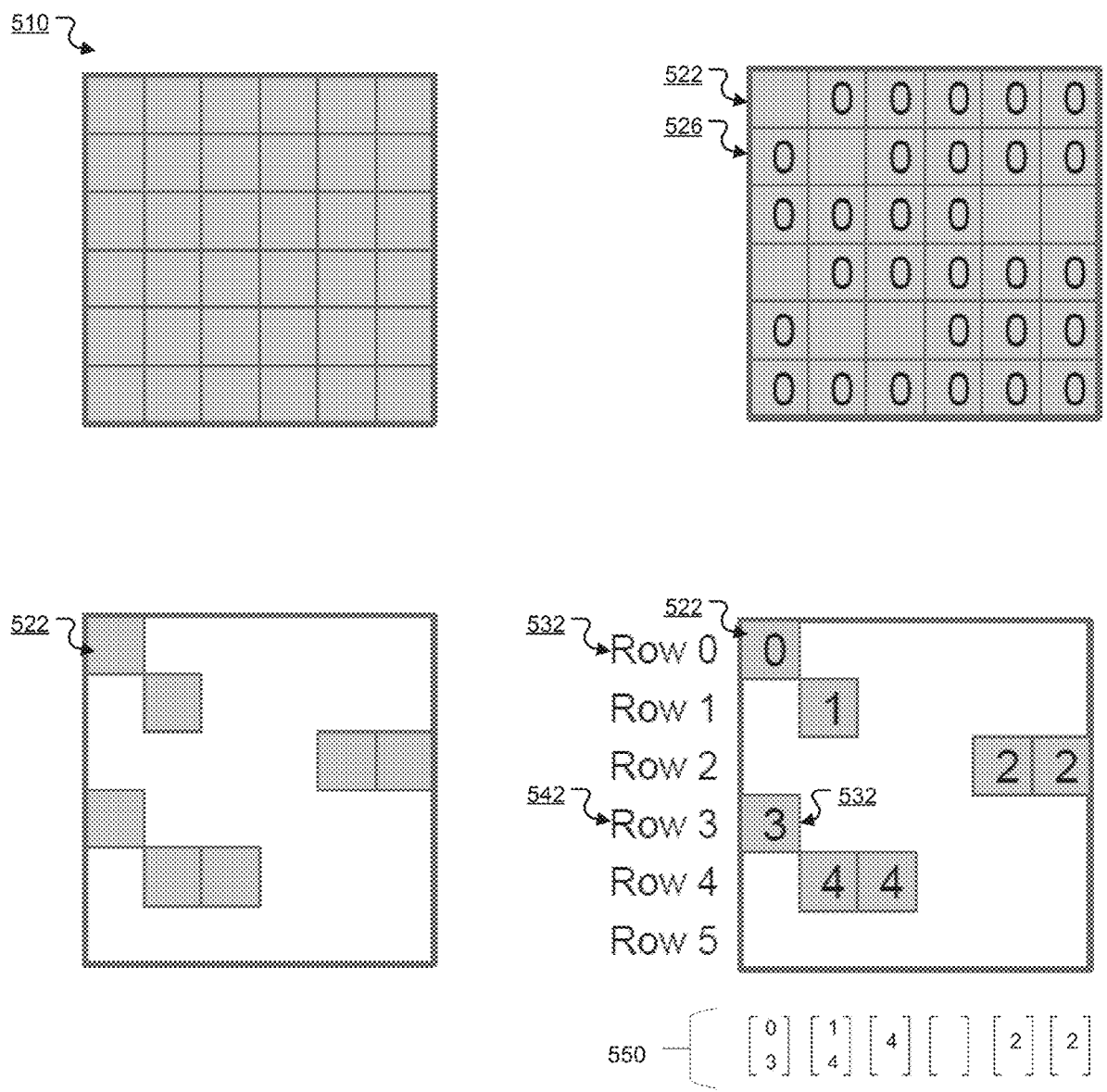
FIG. 5 shows example illustrations of preprocessing a matrix to be loaded into a matrix computation unit.

FIG. 5 shows example illustrations of preprocessing a matrix to be loaded into a matrix computation unit.

As illustrated, the first matrix is a matrix 510 of size 6-by-6. The matrix 510 has a plurality of non-zero input values, e.g., input value 522, and a plurality of zero input values, e.g., input value 526.

Preprocessing the matrix involves first deleting all zero input values, e.g., input value 522, from the input matrix 510 and then compressing the remaining input values, e.g., input value 522, of the input matrix 510 along one dimension, e.g., the vertical dimension. To compress along the vertical dimension, the system can assign a corresponding row index label to each non-zero input value, and then compress the non-zero input values along the vertical dimension, i.e., at each column. For example, in the first (left-most) column, the system can assign a '0' label 532 to the input value 522 and a '3' label 542 to the input value 532, indicating that the input values 522 and 532 are located at the first (top-most) and the fourth row of the matrix, respectively, and then compress the label data down a list at the first column. In this manner, the system obtains a representation of the original matrix 510 in compressed sparse column (CSC) format, as shown in the example illustration 550.

The system sends, using the hardware circuitry, the non-zero input values and the index metadata to the array of MxN cells (406).

Typically, the system sends the non-zero input values and the index metadata along one dimension of the array, e.g., from the left to the right, or from the top to the bottom. For example, when loading a matrix encoded in CSC representation, the system can send a corresponding input value to a distinct top-most cell of the array, i.e., a cell along a top-most row of the array. As another example, when loading a matrix encoded in CSR representation, the system can send a corresponding input value to a distinct left-most cell of the array, i.e., a cell along a left-most column of the array.

Figure 6A:
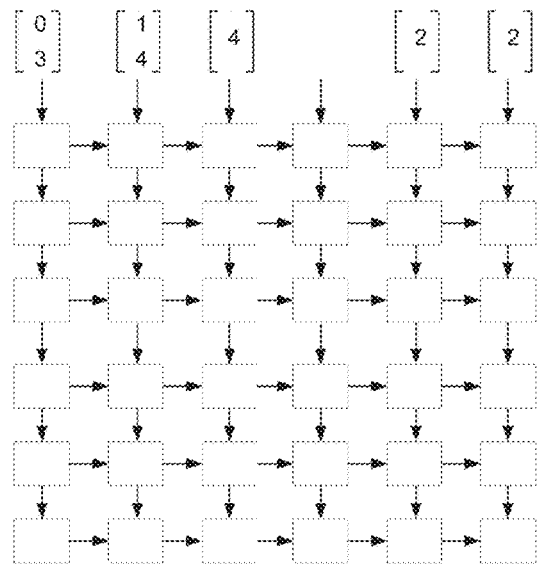
FIGS. 6A-B show example illustrations of loading a matrix into a matrix computation unit.
Figure 6A:
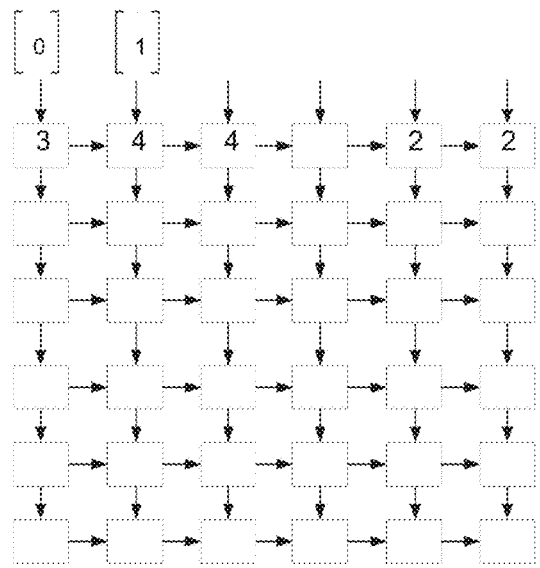
Figure 6A:
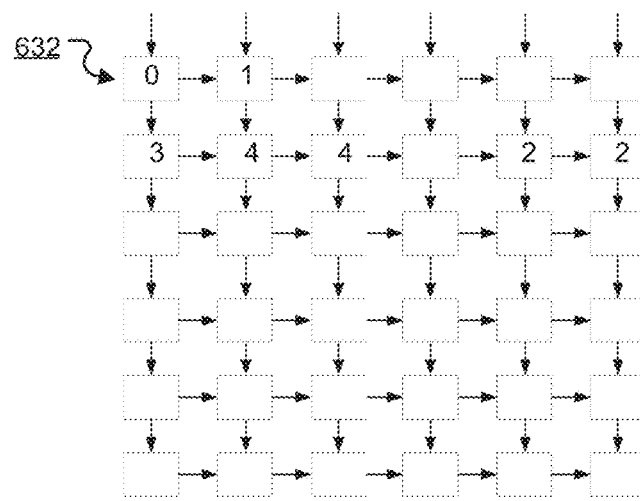
Figure 6B:
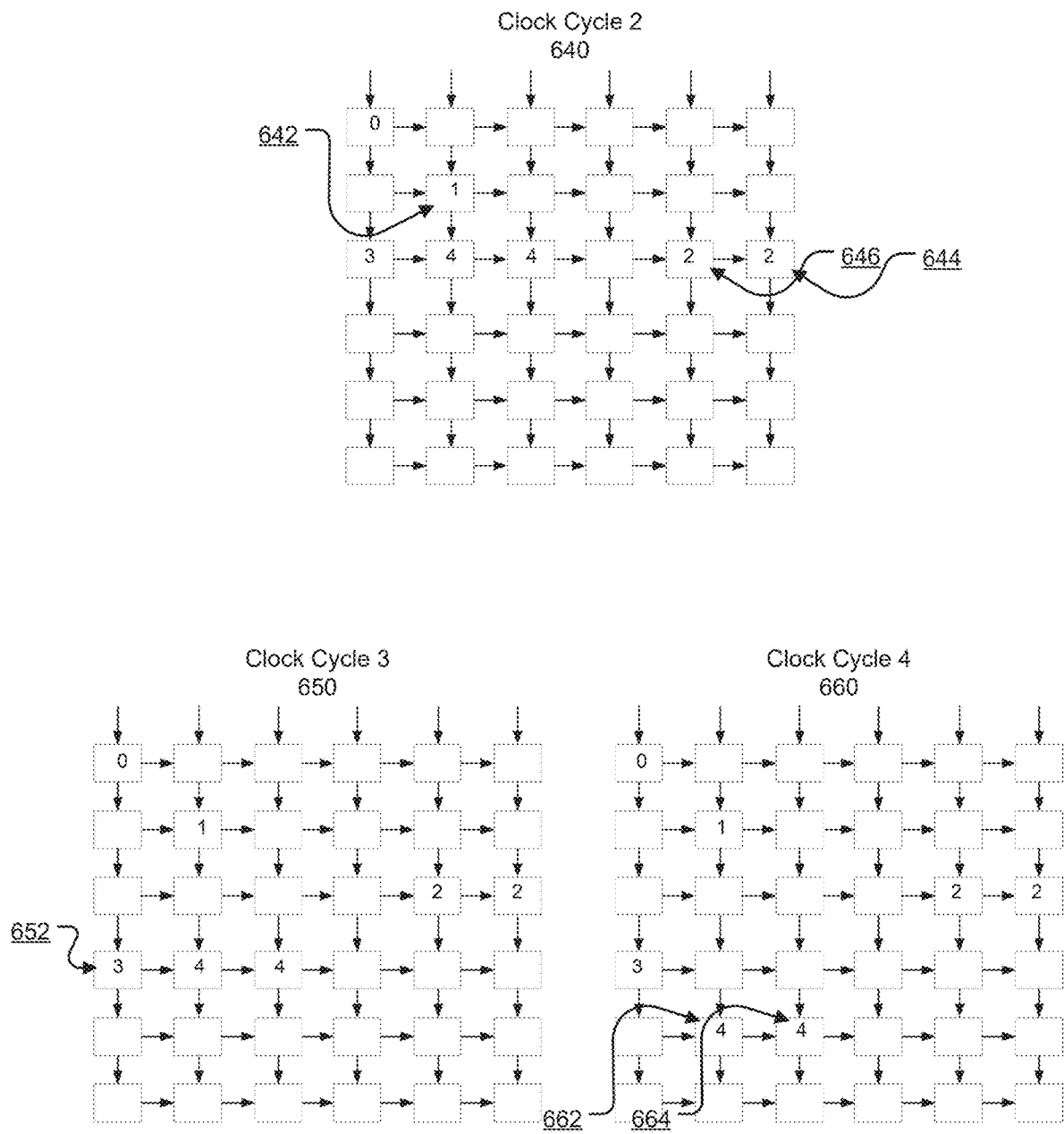

FIGS. 6A-B show example illustrations of loading a matrix into a matrix computation unit with a 6-by-6 array of cells. Non-zero input values of the matrix as well as associated row index metadata, as described above with reference to FIG. 5, can be sent to cells at distinct columns of the array before matrix operations begin. Additionally, injection of the non-zero input values within each column can be independent of other columns. That is, no cross-column communication is needed in the case of sending input values down to cells along the columns. Therefore, the injection of input values across distinct columns need not begin at the same time—they can be staggered in an order of arrival of the input values at the top fringe of the matrix computation unit, thereby facilitating flexible timing, e.g., systolic array timing.

By way of illustration, at 610, the system sends data including a first set of two non-zero input values as well as their associated row indices '0' and '3' to a first column of the array. The system sends data including a second set of two non-zero input values as well as their associated row indices '1' and '4' to a second column of the array. The system sends data including a third set including a single non-zero input value as well as its associated row index '4' to a third column of the array. The system sends no data to a fourth column of the array. The system sends data including a fifth and a sixth set each including a single non-zero input value as well as its associated row index '2' to a fifth and a sixth column of the array, respectively. After every clock cycle, the non-zero input values and their associated row index metadata can be shifted by one cell and in one dimension, e.g., from top to bottom. Although the system has been described with input values being sent to columns of the array, in some implementations, the input values are sent to rows of the array.

Then, at each of some or all of the M×N cells in the array (referred to below as "the particular cell"), the system makes use of a comparator unit associated with the particular cell to determine whether a particular non-zero input value should be stored at the particular cell or shifted to an adjacent cell of the particular cell. In some implementations, the system can do this at each of all of the M×N cells in the array. In other implementations, however, the system can do this only at some of the M×N cells in the array, e.g., at each of all cells except the bottom-most cells in the array, assuming that any input values that have not yet reached their destinations will be loaded into cells along the bottom-most row.

In more detail, the system receives, at the particular cell of the M×N cells in the array, the particular non-zero input value and corresponding index metadata for the particular non-zero input value (408).

As described above, the particular cell can include a register, e.g., a FIFO register, that stores an input value. The register can receive the input value from a top adjacent cell or from an input value fetcher interface, depending on the position of the cell within the array. Alternatively, the register can receive the input value from a left adjacent cell, i.e., an adjacent cell located to the left of the particular cell, or from a value loaders, again depending on the position of the cell within the array.

The system determines, at the particular cell of the M×N cells in the array and from the corresponding index metadata for the particular non-zero input value whether to store the particular non-zero input value at the cell for use in performing multiplication or to shift the particular non-zero input value to another cell (410).

For example, on a first clock cycle ("clock cycle 0"), 620, the array has '3' inside a top-left cell. The '3' represents the non-zero input value labeled with row index '3' stored in the cell. The array also has non-zero input values labeled with '4', '4', '2', and '2' that are stored in the second, third, fifth, and sixth cells along the first (top-most) row of the array, respectively. The system determines, from the corresponding index metadata associated with the non-zero input values, that none of the non-zero input values has reached its destination cell. For example, at the top-left cell, the system makes use of the comparator at the cell to compare row index '3' associated with the non-zero input value against the row index '0' of the top-left cell, and determines that the indices are not equal to one another.

On a next clock cycle ("clock cycle 1"), 630, the non-zero input values labeled with row indices '3', '4', '4', '2', and '2' are shifted down to respective cells under the cells in the first row, and another non-zero input value from the matrix labeled with index '0', is loaded into the top-left cell as well as an non-zero input value from the matrix labeled with index '1' into a top-most cell at a second column.

At the top-left cell 632, the system determines that the non-zero input value labeled with row index '0' has reached the destination cell, i.e., after using a comparator unit at the cell 632 to compare the row index, i.e., '0' which indicates the first row, with the location index of the top-left cell 632 which indicates that cell 632 is in the first row of the array, and determining that there is a match.

On a third clock cycle, ("clock cycle 2"), 640, the remaining non-zero input values that are not yet in place are shifted again. For each of the remaining non-zero input values that are not yet in place, the associated metadata that indicates which cell in the array the non-zero input value should be loaded into is also shifted along with the non-zero input value. In the first column, the non-zero input value labeled with row index '3' is shifted down to a third cell from where it was stored on the previous cycle, while the non-zero input value labeled with row index '0' remains at where it was stored on the previous cycle. In the second column, the non-zero input values labeled with row indices '1' and '4' are shifted down by one cell from where they were stored on the previous cycle, respectively. Similarly, in the third, fifth, and sixth columns, the non-zero input values labeled with row indices '4', '2', and '2' are shifted down to cells along the third row, respectively.

At the cell 642, the system determines that the non-zero input value labeled with '1' has reached the destination cell, i.e., after using a comparator unit at the cell to compare the corresponding the row index, '1' which indicates the second row, with the location index of the cell 642 which indicates that cell 642 is in the second row of the array and determining that there is a match. Similarly, at the cells 644 and 646, the system determines that the input values labeled with row indices '2' have reached the destination cells, respectively.

On a fourth clock cycle, ("clock cycle 3"), 650, the non-zero input values that are not yet in place are shifted again. In the first column, the non-zero input value labeled with row index '3' is again shifted down to a fourth cell from where it was stored on the previous cycle. In the second column, the non-zero input value labeled with row index '4' is shifted down to a fourth cell from where it was stored on the previous cycle, while the non-zero input value labeled with row index '1' remains at where it was stored on the previous cycle. In the third column, the non-zero input value labeled with row index '4' is shifted down by one cell to the fourth cell. In the fifth and sixth columns, the non-zero input values labeled with row indices '2' remain at where they were stored on the previous cycle.

At the cell 652, the system determines that the input value labeled with row index '3' has reached the destination cell, i.e., after using a comparator unit at the cell to compare the corresponding row index, '3' which indicates the fourth row, with the location index of the cell 652 which indicates that cell 652 is in the fourth row of the array and determining that there is a match.

On the fifth clock cycle, ("clock cycle 4"), 660, the non-zero input values that are not yet in place are shifted again. In the second and third columns, the input values labeled with row indices '4' are again shifted down by one cell from where they were stored on the previous cycle.

At the cells 662 and 664, the system determines that the input values labeled with row indices '4' has reached their destination cells, e.g., after using a comparator unit at the cell 662 to compare the corresponding row index, '4' which indicates the fifth row, with the location index of the cell 662 which indicates that cell 662 is in the fifth row of the array and determining that there is a match.

In particular, after five clock cycles, and as shown in the example illustration 660 of FIG. 6B, all non-zero input values from the matrix have now reached their destination cells within the example 6-by-6 array of cells.

In some implementations, each cell within the array can be initialized to have a default value of zero (or null) before the first input matrix is loaded into the array. Once the non-zero input values are in place, i.e., as the array begins operating on the first input matrix, each of the cells that do not have a non-zero input value can operate as if a zero input value had been loaded to it, e.g., based on a control signal stored in the cell specifying that no index associated with any non-zero input value ever explicitly matched its location index.

In some implementations, either during or after loading the first input matrix into the matrix computation unit, the system can load, in a similar or different manner, a second input matrix into the matrix computation unit. At a particular cell of the matrix computation unit, once both the first and second input values from the first and second input matrices are determined to be in place, e.g., via control signals, the system can proceed to perform calculations using the first and second input values stored within the cell, e.g., by using the multiplication or summation circuitries within the cell. When performing the calculation, the system can use only the non-zero input values from the first input matrix.

Although the example of FIGS. 6A-B depicts loading a same matrix into a matrix computation unit over multiple consecutive clock cycles, this is not necessary. In the case of loading a sequence of multiple one-hot matrices (i.e., one-hot matrices encoded in either CSR or CSC format) into the matrix computation unit, a different matrix may be used at every clock cycle. A one-hot matrix refers to a matrix in which each column (or row) has one and only one non-zero input value, e.g., one, and the other input values are zero. Not only does this extend the agility of the matrix computation unit, e.g., when configured as a matrix multiply unit, but it also effectuates permutation and table lookup functionality, e.g., when configured as a permutation unit or an arithmetic unit.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

Embodiment 1 is a method performed by a hardware device comprising circuitry for an array having M×N cells, the method comprising:
  receiving, at the hardware circuitry, a plurality of non-zero input values from a first input matrix to be multiplied with a second input matrix using the array, the first input matrix comprising the plurality of non-zero input values and a plurality of zero input values;
  receiving, at the hardware circuitry, index metadata that indicates, for each non-zero input value in the plurality of input values, which cell of the M×N cells in the array the non-zero input value should be loaded into;
  sending, using the hardware circuitry, the non-zero input values and the index metadata to the M×N cells; and
  at a particular cell of the M×N cells in the array:
    receiving a particular non-zero input value and corresponding index metadata for the particular non-zero input value; and
    determining from the corresponding index metadata for the particular non-zero input value whether to store the particular non-zero input value at the cell for use in performing multiplication or to shift the particular non-zero input value to another cell,
  wherein M and N are positive integers larger than one.

Embodiment 2 is the method of embodiment 1, further comprising, at the particular cell of the M×N cells in the array and prior to sending the non-zero input values and the index metadata to the M×N cells: automatically loading a zero input value into the cell.

Embodiment 3 is the method of any one of embodiment 1-2, wherein sending the non-zero weight input values and the index metadata to the M×N cells comprises sending the non-zero weight input values along a first dimension of the array that has the M×N cells.

Embodiment 4 is the method of any one of embodiments 1-3, wherein the first dimension of the array comprises a vertical dimension of the array; and
  sending the non-zero weight inputs and the index metadata to the M×N cells along the first dimension of the array comprises sending the non-zero weight inputs and the index metadata beginning from a top fringe of the array.

Embodiment 5 is the method of any one of embodiments 1-3, wherein the first dimension of the array comprises a horizontal dimension of the array; and
  sending the non-zero weight inputs and the index metadata to the M×N cells along the first dimension of the array comprises sending the non-zero weight inputs and the index metadata beginning from a left fringe of the array.

Embodiment 6 is the method of any one of embodiments 1-5, wherein the index metadata comprises an absolute fixed-length row index for each non-zero input value.

Embodiment 7 is the method of any one of embodiments 1-5, wherein the index metadata comprises a run-length encoded row index for each non-zero input value.

Embodiment 8 is the method of any one of embodiments 1-5, wherein the index metadata comprises a bitmap of locations of the non-zero input values in the M×N cells of the array.

Embodiment 9 is the method of any one of embodiments 1-8, wherein the hardware device further comprises a comparator for each cell in the M×N cells of the array, the comparator configured to compare (i) the index metadata for each non-zero input value with (ii) an index of the cell that indicates its location in the M×N cells along the first dimension of the array.

Embodiment 10 is the method of any one of embodiments 1-9, wherein the plurality of input values are in a compressed sparse column (CSC) matrix format.

Embodiment 11 is the method of any one of embodiments 1-10, wherein the hardware device further comprises a first-in, first-out (FIFO) register for each cell in the M×N cells of the array, and wherein loading the respective non-zero input value into the cell comprises enqueuing the respective non-zero input value in the FIFO register associated with the cell.

Embodiment 12 is the method of any one of embodiments 1-10, further comprising, for each cell in the array storing a particular non-zero input value:
receiving, using the hardware circuitry, a second input value from the second input matrix; and
determining, using the hardware circuitry, a respective multiplication product based on the particular non-zero input value and the second input value.

Embodiment 13 is the method of any one of embodiments 1-12, wherein the non-zero input values move by one cell per clock cycle.

Embodiment 14 is the method of any one of embodiments 1-13, further comprising:
determining that the first input matrix includes a column that only has zero input values; and
in response, adding a sign bit to the index defined by the corresponding index metadata for each zero input value.

Embodiment 15 is a system comprising: one or more computers and one or more storage devices storing instructions that are operable, when executed by the one or more computers, to cause the one or more computers to perform the method of any one of embodiments 1 to 14.

Embodiment 16 is a computer storage medium encoded with a computer program, the program comprising instructions that are operable, when executed by data processing apparatus, to cause the data processing apparatus to perform the method of any one of embodiments 1 to 14.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by a hardware device comprising circuitry for an array having M×N cells, the method comprising:
receiving, at the hardware device, a plurality of non-zero input values from a first input matrix to be multiplied with a second input matrix using the array, the first input matrix comprising the plurality of non-zero input values and a plurality of zero input values;
receiving, at the hardware device, index metadata that indicates, for each non-zero input value in the plurality of non-zero input values, which cell of the M×N cells in the array a non-zero input value should be loaded into;
sending, using the hardware device, the plurality of non-zero input values and the index metadata to the M×N cells, wherein the sending comprises,
at a particular cell of the M×N cells in the array:
receiving a particular non-zero input value and corresponding index metadata for the particular non-zero input value; and
determining from the corresponding index metadata for the particular non-zero input value whether to store the particular non-zero input value at the particular cell for use in performing multiplication or to shift the particular non-zero input value to another cell,
wherein M and N are positive integers larger than one, and wherein, after the sending, one or more cells of the M×N cells do not store a non-zero input value; and
performing the multiplication by operating each of the one or more cells that do not store a non-zero input value as if a zero input value had been loaded into each of the one or more cells.

2. The method of claim 1, further comprising, at the particular cell of the M×N cells in the array and prior to sending the plurality of non-zero input values and the index metadata to the M×N cells: automatically loading a zero input value into the particular cell.

3. The method of claim 1, wherein sending the plurality of non-zero input values and the index metadata to the MXN cells comprises sending the plurality of non-zero input values along a first dimension of the array that has the M×N cells.

4. The method of claim 3, wherein the first dimension of the array comprises a vertical dimension of the array; and
sending the plurality of non-zero input values and the index metadata to the M×N cells along the first dimension of the array comprises sending the plurality of non-zero input values and the index metadata beginning from a top fringe of the array.

5. The method of claim 3, wherein the first dimension of the array comprises a horizontal dimension of the array; and
sending the plurality of non-zero input values and the index metadata to the M×N cells along the first dimension of the array comprises sending the plurality of non-zero input values and the index metadata beginning from a left fringe of the array.

6. The method of claim 1, wherein the index metadata comprises an absolute fixed-length row index for each non-zero input value.

7. The method of claim 1, wherein the index metadata comprises a run-length encoded row index for each non-zero input value.

8. The method of claim 1, wherein the index metadata comprises a bitmap of locations of the plurality of non-zero input values in the M×N cells of the array.

9. The method of claim 3, wherein the hardware device further comprises a comparator for each cell in the M×N cells of the array, the comparator configured to compare (i) the index metadata for each non-zero input value with (ii) an index of a respective cell that indicates its location in the M×N cells along the first dimension of the array.

10. The method of claim 1, wherein the plurality of non-zero input values are in a compressed sparse column (CSC) matrix format.

11. The method of claim 1, wherein the hardware device further comprises a first-in, first-out (FIFO) register for each cell in the M×N cells of the array, and wherein loading a respective non-zero input value into each cell comprises enqueuing the respective non-zero input value in the FIFO register associated with each cell.

12. The method of claim 1, further comprising, for each cell in the array storing a particular non-zero input value:
receiving, at the hardware device, a second input value from the second input matrix; and
determining, using the hardware device, a respective multiplication product based on the particular non-zero input value and the second input value.

13. The method of claim 1, wherein the plurality of non-zero input values move by one cell per clock cycle.

14. The method of claim 1, further comprising:
determining that the first input matrix includes a column that only has zero input values; and
in response, adding a sign bit to an index defined by corresponding index metadata for each zero input value in the column.

15. A system comprising one or more computers and computer-readable medium coupled to the one or more computers and having instructions stored thereon, which, when executed by the one or more computers, cause the one or more computers to perform operations comprising:
receiving, at a hardware device comprising circuitry for an array having M×N cells, a plurality of non-zero input values from a first input matrix to be multiplied with a second input matrix using the array, the first input matrix comprising the plurality of non-zero input values and a plurality of zero input values;
receiving, at the hardware device, index metadata that indicates, for each non-zero input value in the plurality of non-zero input values, which cell of the M×N cells in the array a non-zero input value should be loaded into;
sending, using the hardware device, the plurality of non-zero input values and the index metadata to the MXN cells, wherein the sending comprises,
at a particular cell of the M×N cells in the array:
receiving a particular non-zero input value and corresponding index metadata for the particular non-zero input value; and
determining from the corresponding index metadata for the particular non-zero input value whether to store the particular non-zero input value at the particular cell for use in performing multiplication or to shift the particular non-zero input value to another cell,
wherein M and N are positive integers larger than one, and
wherein, after the sending, one or more cells of the M×N cells do not store a non-zero input value; and
performing the multiplication by operating each of the one or more cells that do not store a non-zero input value as if a zero input value had been loaded into each of the one or more cells.

16. The system of claim 15, wherein the operations further comprise, at the particular cell of the M×N cells in the array and prior to sending the plurality of non-zero input values and the index metadata to the M×N cells: automatically loading a zero input value into the particular cell.

17. The system of claim 15, wherein sending the plurality of non-zero input values and the index metadata to the M×N cells comprises sending the plurality of non-zero input values along a first dimension of the array that has the M×N cells.

18. The system of claim 17, wherein the first dimension of the array comprises a vertical dimension of the array; and
sending the plurality of non-zero input values and the index metadata to the M×N cells along the first dimension of the array comprises sending the plurality of non-zero input values and the index metadata beginning from a top fringe of the array.

19. The system of claim 17, wherein the first dimension of the array comprises a horizontal dimension of the array; and
sending the plurality of non-zero input values and the index metadata to the M×N cells along the first dimension of the array comprises sending the plurality of non-zero input values and the index metadata beginning from a left fringe of the array.

20. The system of claim 17, wherein the hardware device further comprises a comparator for each cell in the M×N cells of the array, the comparator configured to compare (i) the index metadata for each non-zero input value with (ii) an index of a respective cell that indicates its location in the M×N cells along the first dimension of the array.

21. A non-transitory computer-readable medium having instructions stored thereon, which, when executed by one or more computers, cause the one or more computers to perform operations comprising:
receiving, at a hardware device comprising circuitry for an array having M×N cells, a plurality of non-zero input values from a first input matrix to be multiplied with a second input matrix using the array, the first input matrix comprising the plurality of non-zero input values and a plurality of zero input values;
receiving, at the hardware device, index metadata that indicates, for each non-zero input value in the plurality of non-zero input values, which cell of the M×N cells in the array a non-zero input value should be loaded into;
sending, using the hardware device, the plurality of non-zero input values and the index metadata to the M×N cells, wherein the sending comprises,
at a particular cell of the M×N cells in the array:
receiving a particular non-zero input value and corresponding index metadata for the particular non-zero input value; and
determining from the corresponding index metadata for the particular non-zero input value whether to store the particular non-zero input value at the particular cell for use in performing multiplication or to shift the particular non-zero input value to another cell, wherein M and N are positive integers larger than one, and wherein, after the sending, one or more cells of the M×N cells do not store a non-zero input value; and performing the multiplication by operating each of the one or more cells that do not store a non-zero input value as if a zero input value had been loaded into each of the one or more cells.

* * * * *